United States Patent Office 2,801,991
Patented Aug. 6, 1957

2,801,991

COPOLYMER OF ETHYLENESULFONYL FLUORIDE AND ACRYLONITRILE

Ross M. Hedrick, Dayton, Ohio, assignor to Monsanto Chemical Company, St. Louis, Mo., a corporation of Delaware No Drawing. Application December 22, 1952, Serial No. 327,420

2 Claims. (Cl. 260—79.3)

The present invention relates to organic fluorine compounds and more particularly provides new and valuable ethylenesulfonyl fluoride polymers.

An object of the invention is the provision of new fluorine-containing polymers. Another object of the invention is the preparation of new homopolymers and copolymers for the synthetic resins and plastics industries. Still another object of the invention is the provision of improved acrylonitrile copolymers.

These and other objects hereinafter disclosed are provided by the following invention wherein ethylenesulfonyl fluoride is polymerized either alone, or in admixture with other compounds copolymerizable therewith.

The ethylenesulfonyl fluoride is formed by contacting ethylenesulfonyl chloride with an inorganic fluoride as described in my copending application, Serial No. 176,535, filed July 28, 1950, of which this application is a continuation-in-part, now U. S. Patent 2,653,973.

Ethylenesulfonyl fluoride is a clear, almost colorless rather high-boiling liquid which is stable under ordinary atmospheric conditions. Upon long standing it tends to undergo polymerization; hence, when storage is contemplated, it is advisable to add to the ethylenesulfonyl fluoride a small quantity of a polymerization inhibitor, e. g., hydroquinone, tert-butyl-catechol, etc. When subjected to heat and/or polymerizing catalysts, it is readily converted to polymeric ethylenesulfonyl fluorides, which according to the degree of polymerization attained, are viscous, semi-solid, or solid resinous materials possessing very good thermal properties and useful as heat-resistant adhesives, impregnating agents or molding resins.

Ethylenesulfonyl fluoride is particularly valuable as a copolymerizing monomer for the preparation of improved synthetic resins and plastics. When subjected to polymerizing conditions in admixture with monomeric compounds whch are copolymerizable therewith, it contributes essentially to the heat stability and plasticity of the final products. Copolymerizable monomers which may be employed with ethylenesulfonyl fluoride include compounds having the vinyl ($CH_2=CH-$) radical, for example, acrylic and methacrylic acid and their esters and nitriles; vinyl substituted aromatic compounds such as styrene and vinylbiphenyl, halides, such as vinyl chloride and vinylidene chloride, ketones such as methyl vinyl ketone and isopropenyl methyl ketone, dienic hydrocarbons such as butadiene and isoprene, etc. Of particular interest are the copolymers of ethylenesulfonyl fluoride and acrylic or methacrylic acid, their esters, or their other derivatives, and especially the copolymers of ethylenesulfonyl fluoride and acrylonitrile or methacrylonitrile. When copolymerized with the acrylic compounds, the ethylenesulfonyl fluoride confers both increased plasticity and increased thermal stability to the final product.

Copolymers of ethylenesulfonyl fluoride and one or more monomers copolymerizable therewith may have the fluoride present therein in any proportion. Notable improvement in plasticity and heat stability is generally demonstrated when there is present in the copolymer at least 1.0 percent, and, preferably, at least 5.0 percent by weight of copolymerized ethylenesulfonyl fluoride. Hence the preferred range of copolymer constituents is from 5 percent to 95 percent by weight of ethylenesulfonyl fluoride and from 95 percent to 5 percent by weight of one or more monomers copolymerizable with the ethylenesulfonyl fluoride. The presence of ethylenesulfonyl fluoride in the monomeric mixture undergoing polymerization tends to accelerate rather than to inhibit the polymerizing reaction. Thus, mixtures of acrylonitrile and the fluoride tend to polymerize more rapidly than does acrylonitrile, itself. Accordingly, lower temperatures may advantageously be employed for the polymerization of the herein described mixtures. The ethylenesulfonyl fluoride polymers may be advantageously prepared by mass polymerizing below about 100° C., although, if desired, higher temperatures, say, temperatures of up to 120° C., may also be employed. However, because of the accelerating effect of ethylenesulfonyl fluoride on the polymerization reaction, polymerizing temperatures of from 20° C. to 80° C. are generally most useful. As may be apparent to those skilled in the art, the temperature used depends upon the rate of polymerization desired, presence or absence of catalyst and/or comonomer and nature of the same, etc. In general, the copolymerization of ethylenesulfonyl fluoride with other polymerizable monomers in proportions so as to yield from 1 percent to 50 percent of copolymerized ethylenesulfonyl fluoride in the interpolymer results in the production of resinous products possessing a heat resistance which is substantially greater than that of homopolymers prepared from the copolymerizing monomers.

The present ethylenesulfonyl fluoride polymers may be produced either by the mass, emulsion, solution or suspension polymerization methods. The polymerization may be made to take place either in the absence of a catalyst or in the presence of a catalyst of polymerization, e. g., an oxygen-yielding compound such as benzoyl peroxide, tert-butyl hydroperoxide, hydrogen peroxide, alkali metal or ammonium salts of peroxy acids such as sodium perborate or ammonium persulfate, etc. Particularly valuable polymerization catalysts are azo type catalysts, e. g., $\alpha,\alpha'$-azodiisobutyronitrile, dimethyl $\alpha,\alpha'$-azodiisobutyrate, $\alpha,\alpha'$-azodiisobutyramide, etc. The polymerization catalysts are employed in concentrations which have been previously found to promote polymerization reactions, i. e., in concentrations of from, say, 0.01 to 5.0 percent by weight of the monomeric material.

The invention is further illustrated, but not limited, by the following examples:

*Example 1*

A mixture consisting of 180 g. of acrylonitrile, 20 g. of ethylenesulfonyl fluoride, 1.0 g. of an emulsifier known to the trade as "Acto 450," 0.6 g. of potassium persulfate, 0.3 g. of sodium bisulfite, and 1000 cc. of distilled water was rotated for 24 hours at a temperature of 25° C. The solid reaction product was separated from the reaction mixture and dried. There was thus obtained 157.4 g. (78.7 percent theoretical yield) of a copolymer, characterized by improved plasticity and thermal stability over polyacrylonitrile and having an ethylenesulfonyl fluoride content of 12.7 percent.

*Example 2*

An attempt was made to copolymerize acrylonitrile with ethylenesulfonyl chloride in order to compare the properties of a probable copolymer therefrom with that of the copolymer of Example 1. Accordingly, a mixture consisting of 18 g. of acrylonitrile, 2 g. of ethylenesulfonyl chloride, 0.1 g. of an emulsifier known to the trade as "Acto 450," 0.06 g. of potassium persulfate, 0.03 g. of sodium bisulfite and 100 cc. of distilled water was rotated for 24 hours at a temperature of 25° C. The solid which formed was separated from the resulting reaction product and dried. There was thus obtained 0.5 g. (2.5 percent theoretical yield) of a polymeric product which analyzed only 0.266 percent chlorine, and thus possessed the characteristics of polyacrylonitrile.

Instead of employing emulsion polymerization, ethylenesulfonyl fluoride may be copolymerized with acrylonitrile by employing other polymerizing techniques, for example, by copolymerization in mass or in solution. The proportion of ethylenesulfonyl fluoride to acrylonitrile may be widely varied, e. g., there may be employed monomer mixtures containing from, say, 5 percent to 95 percent of ethylenesulfonyl fluoride, with the balance being acrylonitrile. For modification of acrylonitrile in such a manner as to retain the valuable properties thereof and at the same time to confer improvement in plasticity and heat stability, a monomer mixture of from, say, 5 percent to 50 percent of ethylenesulfonyl fluoride with the balance being acrylonitrile is most advantageously used.

What I claim is:

1. A copolymer of ethylenesulfonyl fluoride and acrylonitrile, said copolymer containing from 5% to 50% of said fluoride, with the balance being acrylonitrile.

2. The process which comprises forming a mixture consisting of ethylenesulfonyl fluoride and acrylonitrile, said fluoride comprising from 5.0% to 50% by weight of said mixture, and then contacting the mixture with a catalyst of polymerization at a temperature of from 20° C. to 120° C. to form a copolymer of said fluoride with the acrylonitrile.

References Cited in the file of this patent

UNITED STATES PATENTS

| | | |
|---|---|---|
| 2,515,714 | Jones | July 18, 1950 |
| 2,653,973 | Hedrick | Sept. 29, 1953 |